United States Patent [19]

Lettner et al.

[11] 3,798,078

[45] Mar. 19, 1974

[54] WELDING SUBSTANCE AND METHOD OF MAKING SAME

[75] Inventors: Kurt Lettner; Jakob Hans Finkenauer, both of Lohhof, Germany

[73] Assignee: Messer Griesheim GmbH, Frankfurt/Main, Germany

[22] Filed: Oct. 12, 1971

[21] Appl. No.: 188,456

[30] Foreign Application Priority Data
Oct. 14, 1970 Germany............................ 2050482

[52] U.S. Cl........................ 148/26, 75/94, 106/313
[51] Int. Cl........................ B23k 35/24, C22b 9/10
[58] Field of Search....... 148/26; 75/94, 25; 106/89, 106/313, 117, 41

[56] References Cited
UNITED STATES PATENTS

| | | | |
|---|---|---|---|
| 2,631,178 | 3/1953 | Morton | 75/25 |
| 2,799,571 | 7/1957 | Justice | 75/25 |
| 2,194,200 | 3/1940 | Cohn | 148/26 |
| 3,615,787 | 10/1971 | Teramoto | 106/89 |
| 3,200,016 | 8/1965 | Sharav | 148/26 |
| 2,150,625 | 3/1939 | Jones | 148/26 |
| 1,467,825 | 9/1923 | Armor | 148/26 |

*Primary Examiner*—L. Dewayne Rutledge
*Assistant Examiner*—Peter D. Rosenberg
*Attorney, Agent, or Firm*—Karl F. Ross; Herbert Dubno

[57] ABSTRACT

A welding substance such as a submerged arc-welding powder, powdered welding flux, electrode-coating flux and welding assist, and welding-rod core material, is made at least in part from a hydraulic cement or cement clinker after calcination thereof. The cement or cement clinker (cement precursor) can be used in an amount ranging between 5 and 90 percent by weight of the welding-assist composition, preferably 35 - 65 percent by weight, in a particle size below 2.5 mm. The composition is preferably fired at a temperature between 400° to 1,000°C to ensure complete removal of water of crystallization.

4 Claims, No Drawings

WELDING SUBSTANCE AND METHOD OF MAKING SAME

FIELD OF THE INVENTION

My present invention relates to welding substances and compositions; especially welding fluxes and welding assists and to an improved method of making same, especially a method of making mineral solid compositions facilitating welding operations.

BACKGROUND OF THE INVENTION

In many welding systems it is common practice to provide an inorganic or mineral substance such as an arc-submerging powder, a powder flux or the like which can facilitate weld formation in one or more of several ways. The substance may exclude oxygen from sensitive surfaces, may itself be capable of removing oxide films, or may release a substance capable of eliminating some barrier to welding, may improve the quality and uniformity of weld bead, may provide substances capable of stabilizing and maintaining the quality of a welding arc, may combine with other materials at the weld site to produce a slag or otherwise remove impurities by solubilization, chemical reaction and mechanical trapping, etc.

Such inorganic substances have been termed, for the purposes of the present invention, welding substances or compositions and are essentially fluxes, welding assists or welding adjuncts which are provided together with welding electrodes and/or filler rods, to improve welding speed and welding quality.

Numerous ways of using such welding compositions are known in the art, depending upon the type of weld, the nature of the current electrode or filler rod and the substrates to be welded together. For example, in submerged arc-welding, a welding powder is provided to form a blanket within which the welding arc is generated. In other welding systems, the use of powdered fluxes brought to the current site by diverse means, may be employed. In arc welding and like operations, it is not uncommon to provide the welding electrode with a sheath or coating composed of particles of such inorganic materials and they may also be included in the electrode as a central core.

It has been the practice heretofore to make such mineral or inorganic substances from the pure materials or from purified natural minerals containing the desired elements, for example, mixing the solid connected substances and smelting or fusing them. The shiftable body may then be broken up, ground or crushed to the desired particle size for use as a welding powder or an arc-submerging powder, may be provided with a binder and applied to a wire electrode or rod in the form of a sheath and/or combining the powder with other materials which are incorporated in a core introduced by conventional means into a welding rod or wire. The particle size of the connected product, of course, will depend upon the nature of the welding operation.

As raw materials for conventional welding powders and welding assists, it has been the practice to make use of such natural minerals as calcite, aragonite, dolomite, magnesite, quartz sand, wollastonite, clay, chamotte, bauxite, pyrolusite, rutile and fluorspar. These minerals provide calcium oxide, magnesium oxide, silicon dioxide, alumina, manganese oxide, titanium dioxide and calcium difluoride which are required in various compositions and proportions in the finished product.

To this end, the minerals are mixed in varying quantities in comminuted form, smelted and cooled to harden whereupon the melt is broken up by crushing or grinding to produce the powder of the desired composition. It will be apparent that this method has the disadvantage that, while the mineral substances are frequently inexpensive, they may contain impurities which are undesired in the final product and include crystal-bound water or the like which may constitute a contaminate or give rise to undesired effects during welding. Another contaminant which is frequently present and has been found to be disadvantageous, is carbon dioxide.

The alternative of using pure calcium oxide, calcium fluoride, magnesia, alumina, silica, manganese oxide and titanium has the disadvantage that the raw materials are highly expensive and the resulting composition reflects the added cost.

It should be mentioned that the presence of impurities such as water of crystallization or carbon dioxide and especially the latter, is highly disadvantageous during welding since the impurities are released at the high temperatures of welding and tend to make the welding seam or bead porous and to otherwise interfere with the formation of a continuous and defect-free weld.

OBJECTS OF THE INVENTION

It is the principal object of the present invention to provide a method of making a welding assist such as a welding powder for submerged arc welding, a coating material for coated welding electrodes and a filler substance for welding rod and wire having a core, which avoids the aforementioned disadvantages and provides defect-free welds.

Another object of the invention is to provide an improved welding method which is capable of reducing the tendency toward defects in the weld seam or bead, especially eliminating those defects which may be due to the presence of carbon dioxide.

Yet another object of the invention is to provide an improved material for use in welding so as to obtain improved welds and at lower cost than has been possible heretofore.

SUMMARY OF THE INVENTION

These objects and others which will become apparent hereinafter, are attained in accordance with the present invention, in a method of making a welding assist, such as a welding or flux-forming powder for submerged-arc and other welding processes, for the coating of welding electrodes or for a core of a welding electrode, wire or rod, which comprises incorporating as the, or a, mineral-supplying component, cement or cement precursor, preferably in an amount ranging between 5 and 90 percent by weight of the welding-assist composition.

The term "cement" is used herein to refer to hydraulic cements comminuted from the cement clinker, formed by the firing of cement composition, especially portland cement, blast-furnace or ferrocement, puzzolan and high-alumina cements and, in general, types I – V of Federal Specification SS-C 192. The term "cement precursor" is used here to refer to the products of the cement-making process subsequent to the firing in the cement kiln and includes the crude cement clinker, the dust, fines and comminuted clinker and cement powders of various particle size recovered during the firing process and following firing and during comminution.

The invention is based upon our discovery that cements or cement precursors, as defined above, contain mineral substances of the type and in the proportions commonly used in welding assists and are free from carbon dioxide and water of hydration which may be detrimental to the welding process. The effective absence of chemically bound carbon dioxide results in the formation of welds that are substantially free from defects in the sense already described. The cement or cement precursor is relatively inexpensive and may even be less expensive than the natural products used heretofore in the production of welding assists, has been found to be highly effective in submerged arc welding, as materials for coating electrodes and as fillers for tubular electrodes and rods. Among the other cements which are suitable are alumina cements, having a high aluminum oxide concentration, blast furnace or ferrocements having a high concentration of iron oxide and cements of mixed composition such as magnesia (MgO)-alumina ($Al_2O_3$) cements. These cements and portland cements have, as their most significant components, calcium oxide (CaO), silica ($SiO_2$) and alumina ($Al_2O_3$). It will be understood that the type of cement which is employed and the proportions in which the cement is used with respect to other mineral components, will be determined by the composition of the cement and the desired composition of the welding assist. For example, when it is desired to provide a basic welding assist or powder with a high calcium-oxide component, as is particularly desirable for the welding of sheets of metal to be exposed to low temperatures, e.g., those of liquefied gases, I prefer to use a portland cement as the raw material containing 57 to 66 percent by weight calcium oxide.

For welding assists having a high slagging rate and slag solubility, it has been found to be desirable to use cement or cement precursors of a high alumina content such as are obtained with alumina cements. To the extent that a high iron-oxide content may be desirable, ferrocements such as ferroportland cement may be used. Two or more cements may be combined or individual minerals may be combined with one or more cements to obtain the desired composition.

According to another feature of the invention, welding powder is made according to the present invention with 5 percent by weight to 90 percent by weight, preferably 35 percent by weight to 65 percent by weight cement and cement precursors, the balance being naturally occurring minerals or pure inorganic components such as those mentioned above. For the formation of agglomerated welding powder, it has been advantageous to provide the cement or cement precursors serving as the raw materials in a particle size below about 2.5 mm. In this case, the agglomerated particles may be of a larger particle size with the other substances of the composition forming a coating on the cement particle. The cement may also be provided as a dust-like substance, held together only with the binder. Conventional binders of the type hitherto employed in the production of welding assists may, of course, be used here as well. Typical binders may be synthetic resins vaporizable at the welding temperature such as polytetrafluorethylene and phenolic acid.

The invention also resides in the use of agglomerated welding powder to assist in the welding of metals in which the slag is to have a definitive viscosity ensuring a defect-free weld-bead surface. This is obtained with high alumina cements preferably those having up to 65 percent by weight alumina with the highly alumina concentrations providing the best results.

Not only does any conventional welding process, using a mineral welding assist, improve the quality when the welding assist is replaced with those in the present invention, but a considerable saving in cost is obtained without the danger of porous welds. Still greater improvements in the weld quality can be obtained when the agglomerating welding powder according to the present invention is treated at a temperature of 400°C to 1,000°C for a period sufficient to prevent further weight loss and hence to drive any residual water of crystallization from the composition.

SPECIFIC EXAMPLES

EXAMPLE I

An agglomerated welding powder is made from 50.4 percent by weight high-alumina cement, 29.8 percent by weight naturally occurring pyrolusite, 9.8 percent by weight quartz sand and 10.0 percent by weight fluorspar. The mixture is agglomerated with waterglass to an average particle size between 0.2 and 2.3 mm from powder having a particle size of 0.05 to 0.1 mm. The coarser and finer particles are separated from those of the indicated particle size and the product is heated to a temperature of 800°C until weight loss ceases. The completed welding powder has the following composition:

18.0% by weight — calcium oxide
20.3% by weight — silicon dioxide
26.0% by weight — manganese oxide
23.2% by weight — alumina
1.9% by weight — magnesia and
10.4% by weight — calcium difluoride The powder is used in the submerged-arc welding of sheet steel and provides effective results at substantially reduced cost by comparison with conventional welding powders.

EXAMPLE II

The system of Example I is employed except that aluminum particles of a particle size of 0.1 mm are added during mixing in an amount of 5 percent by weight of the composition as a deoxidizing agent. The aluminum-oxide content of the final product is thereupon somewhat higher and essentially the same results are obtained as those described in Example I.

EXAMPLE III

The systems of Example I and Example II were carried out using a polytetrafluorethylene suspension in water as the binder. Again, essentially the same results as those already described were obtained.

EXAMPLE IV

Using the binder of Example I, a composition for coating an electrode rod was made from 41.5 percent by weight blast-furnace cement, 44.5 percent by weight rutile, 9.1 percent by weight pyrolusite and 4.9 percent by weight quartz sand. The coating was applied to the electrode rod and baked at 800°C until weight loss terminated. The coating, excluding the binder had the following composition:

20.4% by weight — silica
46.6% by weight — titanium
17.8% by weight — calcium oxide 3.8% by weight — alumina
2.9% by weight — magnesia
7.1% by weight — manganese oxide
1.4% by weight — iron oxide

EXAMPLE V

Using the method of Example I and the binder of Example III, a filler for the central bore of a cored welding rod is made from 58.3 weight-percent portland cement, 29.2 weight-percent fluorspar, 2.4 weight-percent pyrolusite, 8.0 weight-percent ferromanganese (80 percent manganese, 1 percent carbon, balance iron) and 2.1 weight-percent silicomanganese (74 percent manganese, 1 percent carbon, balance silicon and iron). The rod is filled in the usual manner and the resulting composition, excluding the binder, is as follows:

32.9% by weight — calcium oxide
18.1% by weight — silica
3.4% by weight — alumina
1.2% by weight — $Fe_2O_3$
2.4% by weight — MgO
2.3% by weight — MNO
29.3% by weight — $CaF_2$
8.2% by weight — ferromanganese
2.2% by weight — silicomanganese.

We claim:

1. A welding assist consisting of at least one naturally occurring mineral and a hydraulic cement selected from the group which consists of portland cement, blast furnace, ferrocement, puzzolan and high alumina cement or cement substance selected from the group which consists of cement clinker, dusts, fines, comminuted clinker and cement powder of one of said cements recovered during and following firing and comminution in an amount ranging between 5 and 90 percent per weight of the welding assist, said cement or cement substance being present in a particle size below 2.5 mm, said welding assist being selected from the group which consists of:
   a. a welding powder consisting substantially of 50.4 percent by weight of high-alumina cement, 29.8 percent by weight of pyrolusite, 9.8 percent by weight of quartz sand and 10.0 percent by weight of fluorspar,
   b. an electrode coating composition consisting essentially of 41.5 percent by weight of blast-furnace cement, 44.5 percent by weight of rutile, 9.1 percent by weight of pyrolusite and 4.9 percent by weight of quartz sand, and
   c. a welding-rod filler, consisting essentially of 58.3 percent by weight portland cement, 29.2 percent by weight fluorspar, 2.4 percent by weight pyrolusite and 10.1 percent by weight ferromanganese and silicomanganes.

2. A welding powder consisting of about 50.4 percent by weight high-alumina cement, 29.8 percent by weight pyrolusite, 9.8 percent by weight of quartz sand and 10.0 percent by weight fluorspar, the cement being present in a particle size below 2.5 mm.

3. An electrode-coating composition consisting essentially of substantially 41.5 percent by weight blast-furnace cement, 44.5 percent by weight nytile, 9.1 percent by weight pyrolusite and 4.9 percent by weight quartz sand, and cement being present in a particle size below 2.5 mm.

4. A welding-rod filler consisting essentially of substantially 58.3 percent by weight portland cement, 29.2 percent by weight fluorspar, 2.4 percent by weight pyrolusite and 10.1 percent by weight ferromanganese and silicomanganese, the cement being present in a particle below 2.5 mm.

* * * * *